(12) United States Patent
Forster et al.

(10) Patent No.: US 11,912,356 B2
(45) Date of Patent: Feb. 27, 2024

(54) TRACKED VEHICLE, IN PARTICULAR CONSTRUCTION MACHINE, MORE PARTICULARLY ROAD CONSTRUCTION MACHINE, WITH A TRACK TENSIONING APPARATUS, AND METHOD FOR OPERATING A TRACKED VEHICLE WITH A TRACK TENSIONING APPARATUS

(71) Applicant: BOMAG GMBH, Boppard (DE)

(72) Inventors: Johannes Forster, Saberhausen (DE); Jonathan Stahl, Urmitz (DE)

(73) Assignee: BOMAG GMBH, Boppard (DE)

( * ) Notice: Subject to any disclaimer, the term of this patent is extended or adjusted under 35 U.S.C. 154(b) by 769 days.

(21) Appl. No.: 17/041,187

(22) PCT Filed: Mar. 27, 2019

(86) PCT No.: PCT/EP2019/000099
§ 371 (c)(1),
(2) Date: Sep. 24, 2020

(87) PCT Pub. No.: WO2019/185195
PCT Pub. Date: Oct. 3, 2019

(65) Prior Publication Data
US 2021/0094636 A1     Apr. 1, 2021

(30) Foreign Application Priority Data
Mar. 27, 2018    (DE) .................... 10 2018 002 523.4

(51) Int. Cl.
*B62D 55/30*     (2006.01)
*F16F 9/06*     (2006.01)
*F16H 7/08*     (2006.01)

(52) U.S. Cl.
CPC ............ *B62D 55/305* (2013.01); *F16F 9/068* (2013.01); *F16H 7/08* (2013.01); *F16H 2007/0814* (2013.01); *F16H 2007/0887* (2013.01)

(58) Field of Classification Search
CPC .......... B62D 55/305; F16F 9/068; F16H 7/08; F16H 2007/0814; F16H 2007/0887
See application file for complete search history.

(56) References Cited

U.S. PATENT DOCUMENTS 3,910,649 A    10/1975   Roeskaft
3,972,569 A    8/1976   Bricknell
(Continued)

FOREIGN PATENT DOCUMENTS

CA    2157591    10/1994
CN    2108668    7/1992
(Continued)

OTHER PUBLICATIONS

First Office Action from related Chinese Appln. No. 201980019839.0 dated May 30, 2022. English translation attached.
(Continued)

*Primary Examiner* — Kip T Kotter
(74) *Attorney, Agent, or Firm* — Grossman, Tucker, Perreault & Pfleger, PLLC (57) ABSTRACT

A tracked vehicle, in particular a construction machine, more particularly a road construction machine, with at least one drive motor and a travel pump of a travel drive hydraulic circuit, which is driven by the drive motor, for generating a drive pressure; at least one track unit, said track unit comprising a drive wheel driven via the travel drive hydraulic circuit, at least one guide wheel, a track endlessly running around the drive wheel and the guide wheel, as well as a track tensioning apparatus for tensioning the track, and the
(Continued)

track tensioning apparatus comprising an adjusting device with a track tensioning hydraulic cylinder with which the distance between two wheels of the track unit, in particular the drive wheel and the guide wheel, is adjustable for tensioning the track, the track tensioning hydraulic cylinder being connected via a hydraulic tensioning line to a hydraulic pretensioning source via which it can be loaded with an initial pretensioning pressure. The tensioning apparatus further has a damping device with a spring for damping pressure peaks in the adjusting device. A method for operating a tracked vehicle with a track unit.

13 Claims, 7 Drawing Sheets

(56) References Cited

U.S. PATENT DOCUMENTS

| | | | |
|---|---|---|---|
| 5,378,204 A | 1/1995 | Urvoy | |
| 6,062,327 A * | 5/2000 | Ketting | B62D 55/12 305/144 |
| 6,224,172 B1 | 5/2001 | Goodwin | |
| 6,929,334 B2 * | 8/2005 | Verheye | A01D 41/02 137/255 |
| 9,016,810 B2 | 4/2015 | Busley et al. | |
| 2003/0117017 A1 | 6/2003 | Hoff | |
| 2009/0072617 A1 | 3/2009 | Alfthan | |
| 2019/0135356 A1 * | 5/2019 | Obermeier-Hartmann | B62D 55/30 |

FOREIGN PATENT DOCUMENTS

| | | | |
|---|---|---|---|
| CN | 202657135 | 1/2013 | |
| DE | 4407764 | 9/1994 | |
| DE | 4412552 | 10/1994 | |
| DE | 60105966 T2 * | 3/2006 | ......... B62D 49/0635 |
| DE | 102009013708 | 9/2010 | |
| EP | 1559596 | 8/2005 | |
| GB | 2277307 A * | 10/1994 | ............ B62D 55/30 |
| GB | 2330563 | 4/1999 | |
| JP | 55-51672 | 4/1980 | |
| JP | H05155362 | 6/1993 | |
| SU | 18320 | 2/1980 | |

OTHER PUBLICATIONS

International Search Report from corresponding PCT Appln. No. 1PCT/EP2019/000099, dated Jul. 11, 2019.

* cited by examiner

TRACKED VEHICLE, IN PARTICULAR CONSTRUCTION MACHINE, MORE PARTICULARLY ROAD CONSTRUCTION MACHINE, WITH A TRACK TENSIONING APPARATUS, AND METHOD FOR OPERATING A TRACKED VEHICLE WITH A TRACK TENSIONING APPARATUS

FIELD

The invention relates to a tracked vehicle, in particular a construction machine, more particularly a road construction machine, with a track tensioning apparatus, and to methods for operating a tracked vehicle, in particular a construction machine, with a track tensioning apparatus.

BACKGROUND

Tracked vehicles of the present type are motor vehicles with a track unit. Essential elements of a track unit include a track, often also called an endless track, and at least two wheels around which the track runs, one of which is driven (drive wheel) and at least one of which essentially serves to guide the track (guide wheel), and optionally track rollers. In practical use it is important that the track is tensioned within a certain tension range to prevent the track from jumping off on the one hand and to keep wear on the track as low as possible on the other hand. For this purpose, so-called track tensioning apparatuses are usually used. Such track tensioning apparatuses for tracked vehicles, in particular for construction machines with track units, are known in the prior art. The track tensioning device of the present type is a crawler track tensioning device. Such tracked vehicles, especially construction machines, and more particularly road construction machines, usually comprise at least one drive motor, usually an internal combustion engine, and a travel pump of a travel drive hydraulic circuit, which is driven by the drive motor, for generating a drive pressure. The drive pressure is used to drive the track unit, more specifically the drive wheel. For this, the drive wheel is typically driven via the travel drive hydraulic circuit. For tensioning, the track tensioning apparatus specifically comprises an adjusting device with a track tensioning hydraulic cylinder with which the distance between at least two wheels of the track unit, in particular between the drive wheel and the guide wheel and/or a first and a second guide wheel, is adjustable for tensioning the track, typically in horizontal direction, the track tensioning hydraulic cylinder being connected via a hydraulic tensioning line to a hydraulic pretensioning source via which it can be loaded with an initial pretensioning pressure. With the pretensioning source, the track is thus tensioned to an initial value, for example in particular by generating a desired hydraulic pressure inside the track tensioning cylinder. Starting from this pretension or this pretensioning pressure, however, changes of the pressure applied inside the track tensioning hydraulic cylinder may occur during operation, be it due to wear, a change in the direction of rotation of the track (for example when changing from forward to reverse), threading of foreign objects between the drive wheel or the guide wheel and the track, for example stones or the like, or due to the polygon effect of the individual track links of the track during traveling operation. Such pressure peaks are undesirable since they result in an unsafe operating situation and increase wear and tear significantly. To avoid or mitigate potentially occurring pressure peaks in the track tensioning hydraulic cylinder, it is now known that the track tensioning apparatus further has a damping device with a spring, in particular a compression or extension spring, for damping pressure peaks in the adjusting device. Such a spring may, for example, be functionally arranged between the track tensioning hydraulic cylinder and the guide wheel, as disclosed, for example, in DE 10 2009 013 708 A1. The problem with such arrangements, however, is that the tensioning force varies with a change in the compression position of the spring of the damping device and in particular increases with increasing compression position. It is, however, desirable to configure the track tensioning apparatus such that the pressure inside the adjusting hydraulic cylinder is as constant as possible across approximately the entire spring travel of the spring of the damping device.

Another challenge in operating a track unit as described above is that the pressure level required to maintain sufficient track tension changes when the direction of travel is changed. The guide wheel may, for example, be arranged in the forward direction in front of the drive wheel, so that in this case the track is supported by the drive wheel, which absorbs the resulting force from the drive torque. When the direction of travel is reversed, this situation changes such that the track is now supported by the guide wheel, which frequently causes the damping device to compress strongly. This increases the risk of the track jumping off unintentionally during reverse travels. In this context, U.S. Pat. No. 6,224,172 B1, for example, already proposes a track tensioning apparatus with a traveling direction-dependent pressure control. A sensor is provided for this purpose which determines the pressure conditions in the travel drive hydraulic circuit. The pressure inside the adjusting hydraulic cylinder is then adjusted via a control unit such that it is higher or lower in relation to the respective opposite direction of travel. This approach is relatively complex and expensive since, for example, an electric control system and additional hydraulic valves are needed. Further, so-called delta units are also known in which the drive wheel is located above two guide wheels in vertical direction and between the two guide wheels in horizontal direction. The connection of a track tensioning apparatus to one of the guide wheels is also known for such track units.

SUMMARY

The object of the invention is thus to provide a generic tracked vehicle, in particular a construction machine with at least one track unit, as well as a method for operating a tracked vehicle, in particular a construction machine, which overcome the above-mentioned problems, and thus in particular to provide a solution for a track tensioning apparatus in which, on the one hand, the tensioning pressure inside the track tensioning hydraulic cylinder can be optimally controlled, in particular regulated, depending on the current direction of travel and, on the other hand, at the same time an existing tensioning pressure inside the track tensioning hydraulic cylinder is influenced as little as possible by different compression positions of the compression spring of the damping device. Essentially, the functions "tensioning" and "damping" are to be decoupled from each other for this purpose.

The object is achieved with a tracked vehicle, in particular a construction machine, more particularly a road construction machine, and a method for operating a tracked vehicle, in particular a tracked vehicle according to the invention.

A generic tracked vehicle comprises at least one drive motor, typically a combustion engine or an electric motor. The drive motor is used to drive a travel pump of a travel drive hydraulic circuit, via which a drive pressure is generated, for example for operating a hydraulic motor which drives the drive wheel. The tracked vehicle further comprises at least one and in particular several track units. Essential elements of said at least one track unit include a drive wheel driven via the travel drive hydraulic circuit (the drive being provided, for example, via a hydraulic motor), at least one guide wheel, a track running around the drive wheel and the guide wheel in an endless manner, for example an endless track, as well as a track tensioning apparatus for tensioning the track. In contrast to the drive wheel, the at least one guide wheel is thus in particular not directly driven but rather runs passively and thus essentially fulfills a guiding function for the circulating track. In addition, the track unit may include one or more track rollers. The essential task of the track tensioning apparatus is to build up a sufficient tension of the circulating track, especially for traveling operation. To this end, it comprises an adjusting device with a track tensioning hydraulic cylinder with which the distance between two wheels of the track unit, in particular between the drive wheel and at least one guide wheel, is adjustable for tensioning the track. For this purpose, the track tensioning hydraulic cylinder is connected via a hydraulic tensioning line to a hydraulic pretensioning source via which it can be loaded with an initial pretensioning pressure. The main task of the hydraulic tensioning line is therefore to provide a fluid supply to the track tensioning hydraulic cylinder to build up the pretension (by pushing the guide wheel and the drive wheel apart). As will be shown below, this line can further be used for damping purposes. For this purpose, the hydraulic tensioning line is supplied with hydraulic fluid via the hydraulic pretensioning source, which comprises, for example, a pump and at least one valve, in particular a switchable shut-off valve. Specifically, it may in particular be intended that when the drive motor is started with the machine stationary, the hydraulic pretensioning source builds up the desired pretension at the track tensioning hydraulic cylinder, and when the desired pretension is reached, the fluid connection between the track tensioning hydraulic cylinder and the hydraulic pretensioning source is blocked or interrupted by the valve. In addition to this mechanism for building up the desired track tension when starting the machine, the tensioning apparatus comprises a damping device with a spring, more specifically an extension or compression spring, for damping pressure peaks in the adjusting device. Such pressure peaks can occur, for example, when traveling over edges or can be caused by foreign objects, for example stones, located between the track and the drive wheel or the at least one guide wheel, or by pressure fluctuations caused by the polygon effect of the drive track.

To achieve the object according to the invention, the damping device has an auxiliary tensioning device which is configured such that it varies the initial pretensioning pressure independently of the pretensioning source depending on the drive pressure in the travel drive hydraulic circuit towards a pretensioning pressure inside the track tensioning hydraulic cylinder which correlates with a change in the drive pressure. The damping device thus comprises a device by means of which it is possible to influence and change the pressurization of the track tensioning hydraulic cylinder via a hydraulic line independently of the aforementioned pretensioning device. The control and regulation of the pressurization during traveling operation of the construction machine is therefore not carried out via the pretensioning source but via the auxiliary tensioning device, which ideally acts hydraulically. The adjustment with the aid of the auxiliary tensioning source in this case occurs in correlation to the drive pressure inside the travel drive hydraulic circuit. If the pressure there increases, according to the invention, this leads to an increase in the pretensioning pressure in the track tensioning hydraulic cylinder via the auxiliary tensioning device, which is achieved by the auxiliary tensioning device acting separately from the pretensioning source. This has the advantage that there is no need to control the pretensioning source during traveling operation.

In an advantageous and therefore preferred configuration according to the invention, the auxiliary tensioning device is configured such that it increases the actual pretensioning pressure inside the track tensioning hydraulic cylinder compared to the initial pretensioning pressure during reverse travel compared to forward travel. The actual pretensioning pressure is the pressure of the hydraulic fluid applied to the track tensioning hydraulic cylinder during traveling operation, which may differ from the initial pretensioning pressure generated via the hydraulic pretensioning source prior to traveling operation depending on the situation, as already explained above. An increase in the actual pretensioning pressure during reverse travel is advantageous if the drive wheel is located behind the guide wheel as seen in the forward direction of the construction machine, in order to improve the support behavior of the guide wheel.

The pressure changes occurring in the travel drive hydraulic circuit often do not correspond to the changes in track tension for optimum track tension under various operating conditions or traveling directions. For this reason, it has turned out to be preferred that the auxiliary tensioning device is configured as a hydraulic transmission unit, in particular such that it translates pressure changes in the drive pressure into smaller pressure changes inside the track tensioning hydraulic cylinder. This allows the best possible adjustment of the ratio of the extent to which pressure changes in the travel drive hydraulic circuit affect the track tensioning hydraulic cylinder via the auxiliary tensioning device. Important variables that play a role in determining the optimum transmission ratio may be in particular the supply pressure, the maximum driving pressure, the displacement of the respective hydraulic motor, the gear ratio, the hydraulic-mechanical efficiency of a gear and the hydraulic motor, the Turas diameter, the diameter of the track tensioning cylinder and/or the pretensioning force of the spring used.

In a particularly preferred embodiment, the auxiliary tensioning device comprises an auxiliary tensioning hydraulic cylinder with a cylinder and a cylinder piston adjustably mounted therein, which divides the interior of the auxiliary tensioning hydraulic cylinder into a piston space and a piston rod space, the auxiliary tensioning hydraulic cylinder being loaded with an adjusting force by the spring of the damping device, in particular on the piston rod side. All in all, a spring tensioning cylinder is used to form the additional tensioning device. The spring-loaded, in particular compression spring-loaded cylinder piston can be adjusted between two stop end positions within the cylinder in a floating or lock-free manner.

In addition to the piston rod space, the auxiliary tensioning hydraulic cylinder preferably has a spring space separated from the piston rod space, into which the cylinder piston projects at the end and in which the spring, in particular the compression spring, of the damping device is completely arranged. The spring space may in particular be a space ventilated to the outside environment. Alternatively, it is also possible to arrange the spring completely inside a cylinder piston space, in particular on the low-pressure side.

To enable a direct connection of the auxiliary tensioning device to the track tensioning hydraulic cylinder, the auxiliary tensioning device is preferably in fluid communication with the hydraulic tensioning line or directly with the track tensioning hydraulic cylinder via an auxiliary tensioning connection line. If the connection is made to the hydraulic tensioning line, the latter thus also serves to conduct fluid in case of damping. This can be advantageous with respect to the very limited installation space regularly available around the track tensioning hydraulic cylinder.

According to a particularly simple and efficient embodiment, a travel drive connection line from the travel drive hydraulic circuit, in particular its high-pressure side during reverse travel, to the auxiliary tensioning hydraulic cylinder is provided via which the auxiliary tensioning hydraulic cylinder is in fluid conducting connection with the travel drive circuit. It is particularly preferred here to connect the auxiliary tensioning hydraulic cylinder to the travel drive hydraulic circuit exclusively via a single travel drive connection line and exclusively to its high-pressure side during reverse travel. As mentioned, the travel drive hydraulic circuit is a hydraulic circuit between the travel pump and a travel drive, for example a hydraulic motor for driving the drive wheel. This comprises both embodiments in which the hydraulic circuit comprises only a single travel pump and a single travel drive as well as variants in which the hydraulic circuit comprises a single travel pump and multiple travel drives. The aspect that is of particular importance here is that one auxiliary tensioning hydraulic cylinder is used per pump circuit. Depending on the direction of rotation of the hydraulic motor, or the direction in which the travel pump delivers, there is a higher pressure level on one side of the hydraulic circuit between the travel pump and the hydraulic motor than on the other side. The side having the higher pressure level is always the current high-pressure side. Since the track of the track unit is usually supported by the guide wheel when the construction machine is reversing, it is preferable, especially in this operating situation, for the auxiliary tensioning device according to the invention to take effect and selectively increase the pretension inside the track tensioning hydraulic cylinder for reversing. According to the invention, this dependence on the direction of travel also represents the essential application of the auxiliary tensioning device. It is therefore sufficient to connect the auxiliary tensioning device to the travel drive hydraulic circuit exclusively via this one travel drive connection line.

The auxiliary tensioning connection line and the travel drive connection line are preferably arranged such that the auxiliary tensioning connection line is in fluid communication with a piston space and the travel drive connection line is in fluid communication with a piston rod space of the auxiliary tensioning hydraulic cylinder. The auxiliary tensioning hydraulic cylinder thus converts pressure changes occurring in the travel drive hydraulic circuit into smaller pressure changes to the track tensioning hydraulic cylinder. In this way, it is avoided that the comparatively high traveling pressure, for example in the range of 425 bar, acts on the track tensioning cylinder in this magnitude, which would be disadvantageous particularly with regard to track wear and the design of the track tensioning hydraulic cylinder to be used.

An essential advantage of the invention is that the damping device according to the invention can be arranged at a decentralized position relative to the track unit and thus in particular outside the track unit since the connection of the damping device including the auxiliary tensioning device to the track tensioning hydraulic cylinder is effected jointly and exclusively via a hydraulic line, in particular the auxiliary tensioning connection line. This not only enables a particularly space-saving overall arrangement but also provides the possibility of arranging the damping device including auxiliary tensioning device outside the dirty area of the construction machine, for example inside the machine. This reduces the susceptibility to wear and facilitates maintenance works. The auxiliary tensioning device, or its damping device, is preferably arranged on a machine frame.

Generally, it is possible to equip several or each of the track units of a construction machine with their own respective damping device according to the invention. At the same time, however, the invention has the advantage that the damping device may be centrally connected simultaneously to two or more adjusting hydraulic cylinders of two or more track units, in particular all track units of the tracked vehicle, in particular the construction machine. For this, the auxiliary tensioning hydraulic cylinder may, for example, be in fluid communication with several track tensioning hydraulic cylinders simultaneously via the auxiliary tensioning connection line and branches. This enables central damping of all connected track units and at the same time a traveling direction-dependent pressure increase in all connected track tensioning hydraulic cylinders.

The invention generally relates to tracked vehicles. According to the invention, the tracked vehicle is preferably a construction machine, more particularly a road construction machine. Among these, the invention is particularly suitable for a cold milling machine, a road paver or a feeder.

A further aspect of the invention consists in a method for operating a tracked vehicle, particularly a tracked vehicle according to the above claims. Essential steps of the method according to the invention include pretensioning a track of a track unit running around a drive wheel and a guide wheel with the aid of a track tensioning hydraulic cylinder with an initial pretensioning pressure, which is connected to a hydraulic pretensioning source. In this step, the track tensioning hydraulic cylinder is thus initially loaded with a tensioning pressure. This is done, for example, when starting the drive motor of the tracked vehicle. The hydraulic pretensioning source used for this purpose serves only for this pretensioning and has no influence on changes in the pretensioning pressure at the track tensioning hydraulic cylinder during traveling operation. Therefore, once the pretensioning source has built up the desired pretensioning pressure, the fluid connection may then be interrupted towards the pretensioning source by a valve or the like. The pretensioning pressure then existing inside the track pretensioning hydraulic cylinder is herein also referred to as initial pretensioning pressure. Provision is further made for pressure peaks occurring inside the track tensioning hydraulic cylinder during traveling operation to be damped using a spring, in particular a compression or extension spring, of a damping device. Such pressure peaks can at least partially be compensated here, for example, by compressing the spring. The method according to the invention further comprises changing the initial pretensioning pressure towards a pretensioning pressure inside the track tensioning hydraulic cylinder correlating with a change in the drive pressure in the travel drive hydraulic circuit using an auxiliary tensioning device acting in dependence on the drive pressure in the travel drive hydraulic circuit. The task of the auxiliary tensioning device thus is to change the pressure conditions of the hydraulic fluid at the track tensioning hydraulic cylinder independently of the pretensioning device and depending on the direction of travel of the tracked vehicle. For example, the increase in the fluid pressure inside the track tensioning hydraulic cylinder when the tracked vehicle is reversing is not effected via the hydraulic pretensioning source but exclusively via the auxiliary tensioning device. To this end, for example, a valve provided for establishing a fluid connection to the hydraulic pretensioning source then remains closed. Therefore, the method according to the invention does not require using the hydraulic pretensioning source to adjust the pretension during traveling operation.

It is preferred for the method according to the invention that when the initial pretensioning pressure is changed using the auxiliary tensioning device, a cylinder piston of an auxiliary tensioning hydraulic cylinder is loaded on the input side with hydraulic fluid via a travel drive connection line which is in fluid communication with a travel drive hydraulic circuit, and that the auxiliary tensioning hydraulic cylinder is in fluid communication with the track tensioning hydraulic cylinder on the output side. Additionally or alternatively, hydraulic transmission via the auxiliary tensioning device may also be used, in particular such that pressure changes in the travel drive circuit are reduced towards the track tensioning hydraulic cylinder. For further details, reference is made to the discussion of the tracked vehicle according to the invention.

BRIEF DESCRIPTION OF THE DRAWINGS

The invention will be explained in more detail below by reference to the embodiment examples shown in the figures. In the schematic figures.

DETAILED DESCRIPTION OF THE DRAWINGS

Like or functionally like components are designated by like reference numerals in the figures, although designations of recurring components may be omitted in some figures.

Figure 1:
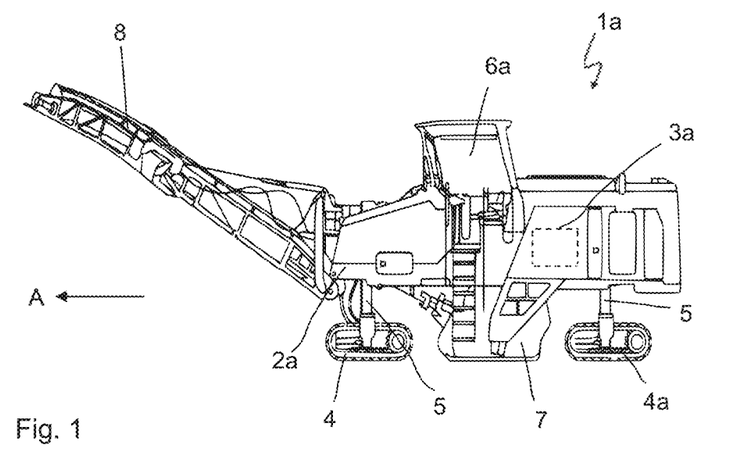
FIG. 1 is a side view of a tracked vehicle of the construction machine type, more specifically a road milling machine.

FIG. 1 illustrates a construction machine of the road milling machine type 1a. Essential elements of the construction machine 1a include a machine frame 2a, a drive motor (for example a combustion engine) 3a, traveling devices in the form of track units 4a, which in the present embodiment example are connected to the machine frame 2a via height-adjustable lifting columns 5, an operator platform 6a, a working device 7 (in this case a milling drum arranged inside a milling drum box) as well as a loading conveyor belt 8. During working operation, the construction machine 1a moves in the working direction or forward direction A over the underlying ground to be processed. The construction machine 1a is driven via a travel pump of a travel drive hydraulic circuit, which is driven by the drive motor 3a, said travel drive hydraulic circuit providing drive energy to one or more hydraulic motors for driving the track units 4a. This can be seen in more detail, for example, in FIG. 2.

Figure 2:
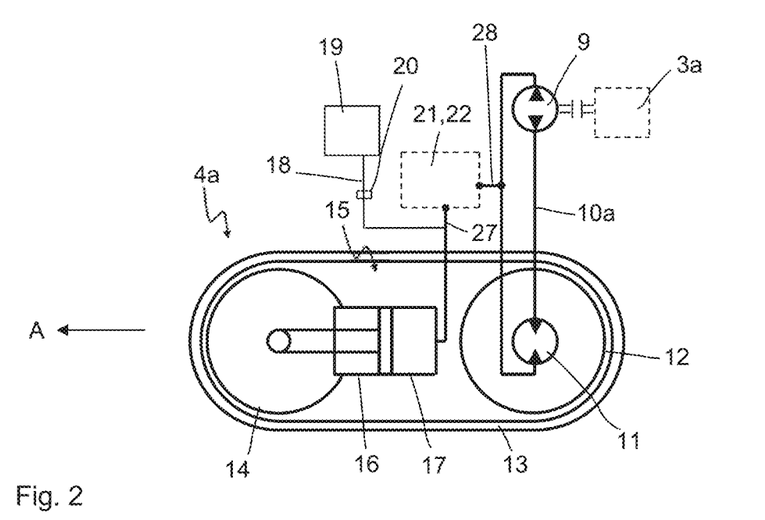
FIG. 2 is a view of a track unit.

FIG. 2 illustrates one of the track units 4a of FIG. 1 and its drive. The travel pump 9 is operated via the drive motor 3a, and further components such as a pump transfer gear, coupling devices, etc. may be interposed here, for example. The travel pump 9 is part of a travel drive hydraulic circuit 10a which further comprises a travel drive motor 11, for example a hydraulic motor. The travel drive motor 11 drives, in particular directly or via a toothed gearing, a drive wheel 12 of the track unit 4a, thus setting a track 13 into an endless circulating motion that drives the drive wheel 12 and a guide wheel that is not directly driven by the travel drive motor, which ultimately enables the travel motion of the construction machine 1. It will be appreciated that the specific design of the track 13 may vary; the track 13 may, for example, comprise replaceable running pads etc. To enable reliable traveling operation, it is important to ensure that the track 13 will not slip off the drive wheel 12 and/or the guide wheel 14. To this end, the track is tensioned using a track tensioning apparatus 15 which can be used to adjust the horizontal distance between the drive wheel 12 and the guide wheel 14. For this, the track tensioning apparatus 15 according to FIG. 2 comprises, among other things, an adjusting device 16 with a track tensioning hydraulic cylinder 17 which is connected on the piston rod side to the guide wheel 14 and on the piston side to a machine frame not shown in more detail in FIG. 2, which also supports the drive wheel 12 in a manner known per se in the prior art. On the piston side, the track tensioning hydraulic cylinder 17 is connected to a hydraulic pretensioning source 19 via a hydraulic tensioning line 18. With the aid of this hydraulic pretensioning source 19, a hydraulic pretensioning pressure (initial pretensioning pressure) is built up inside the track tensioning hydraulic cylinder 17 when the construction machine 1 is started, for example, to achieve a desired initial tension of the track 13. This initial pretensioning pressure may, for example, be preset at the factory, for example in a suitable machine control system. Via a switching valve 20, the fluid connection between the track tensioning hydraulic cylinder 17 and the pretensioning source can be interrupted when the pretensioning pressure in the track tensioning hydraulic cylinder is reached, for example when the construction machine starts moving.

The track tensioning apparatus further comprises a damping device 21. The latter provides a certain degree of elasticity to the track tensioning apparatus 15, for example for damping or compensating for pressure peaks occurring at the track 13 and the track tensioning hydraulic cylinder, respectively, during traveling operation. Further details on the structure and mode of operation of the damping device 21 are given in particular in FIG. 3. However, what is important in the present embodiment example is that the damping device 21 is in fluid communication with both the travel drive hydraulic circuit 10 and the hydraulic tensioning line 18 or the track tensioning hydraulic cylinder 17. This makes it possible to build up an auxiliary tension at the track tensioning hydraulic cylinder 17 correlating to a change in the drive pressure in the travel drive hydraulic circuit 10 in a traveling direction-dependent manner and bypassing the hydraulic pretensioning source 19. For this purpose, the damping device 21 comprises an auxiliary tensioning device 22.

Figure 3:
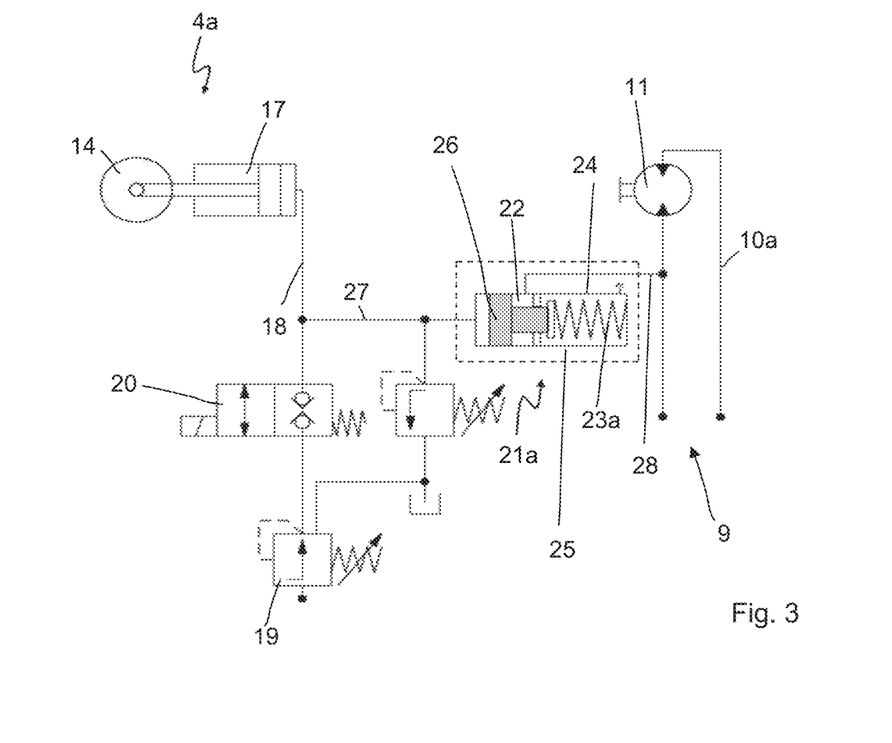
FIG. 3 shows a detail of a hydraulic circuit diagram.

An embodiment example of such a damping device 21 with an auxiliary tensioning device 22 is shown in more detail in FIG. 3. The area framed by dashed lines in FIG. 3 corresponds to the dashed box of FIG. 2. The damping device comprises a compression spring 23a for damping pressure peaks in the track tensioning hydraulic cylinder 17. Depending on the arrangement and type of suspension, it is also possible to use an extension spring, as will be shown in more detail below. The spring is arranged inside a hydraulic cylinder 24 of an auxiliary tensioning hydraulic cylinder 25 together with a cylinder piston 26 mounted in said hydraulic cylinder 24 so as to be adjustable or more specifically axially displaceable. Via an auxiliary tensioning connection line 27, the hydraulic cylinder is connected on the piston side to a hydraulic supply line extending from the pretension source 19 to at least one track tensioning hydraulic cylinder 17, so that the hydraulic cylinder is in fluid conducting connection with the track tensioning hydraulic cylinder on the piston side. Thus, if a pressure peak occurs in the track tensioning hydraulic cylinder 17, it will ultimately affect, via the line system described above, the cylinder piston 26, which changes such a pressure peak by shifting its position to the compression spring 23a and compresses the latter. In this manner, the pressure peak is damped accordingly.

It is now essential that the auxiliary tensioning hydraulic cylinder is simultaneously in fluid conducting connection with the travel drive hydraulic circuit 10a, which is only partially shown in FIG. 3, via a travel drive connection line 28. In this particular embodiment example, the travel drive connection line 28 connects one side of the travel drive connection circuit to the piston rod space 22 of the auxiliary tensioning hydraulic cylinder 25 and thus to the side of the cylinder piston 26 located opposite the auxiliary tensioning connection line 27. If pressure changes occur in the travel drive hydraulic circuit 10a, for example when the direction of travel is reversed, these changes thus affect the pressure conditions in the auxiliary tensioning connection line 27 or at the track tensioning hydraulic cylinder 17 via the travel drive connection line 28 and the damping device 21a. Thus, if the pressure in the travel drive hydraulic circuit 10a increases, the pressure inside the track tensioning hydraulic cylinder 17 will also increase. The auxiliary tensioning hydraulic cylinder 25 in this case acts as a hydraulic transmission unit, so that pressure changes are transmitted in a correlating manner but not one-to-one. If the construction machine now changes its direction of travel, for example by reversing the delivery direction of the travel pump 9 in the travel drive hydraulic circuit 10a (when changing from forward travel to reverse travel), the high-pressure side and the low-pressure side in the travel drive hydraulic circuit also change, which, with the arrangement described above, without the interposition of sensors or other electronic control devices, has a direct effect on the hydraulic pretensioning pressure generated by the auxiliary tensioning device 22 on the at least one track tensioning hydraulic cylinder. Since the conventional arrangements of the guide wheel and the drive wheel in a track unit usually require an increased track tension during reverse travel, the auxiliary tensioning device 22 is therefore ideally connected to that line section of the travel drive hydraulic circuit which is the high-pressure side of the travel drive hydraulic circuit 10a between the travel pump 9 and the drive motor 11 during reverse travel.

Figure 4:
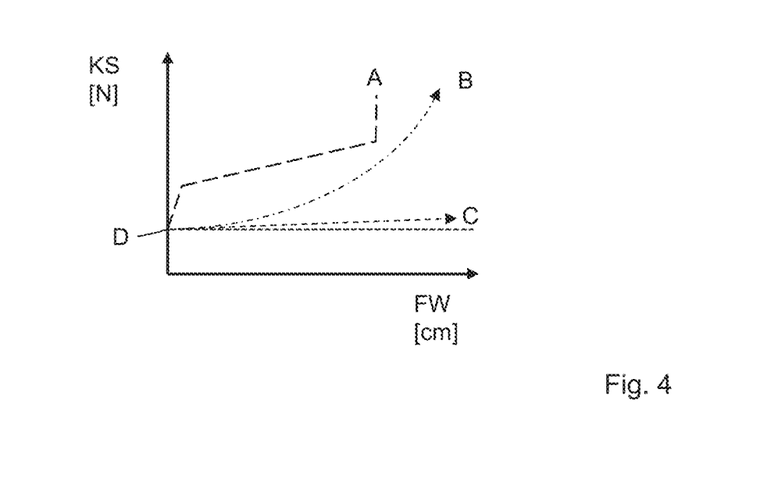
FIG. 4 is a graphical comparison of the dependence of the track tension on the spring travel of the embodiment according to the invention with known prior art solutions.

A particular advantage of the arrangement described above now is that the transmission of the pressure changes from the travel drive hydraulic circuit has practically no effect on the damping characteristic obtained via the compression spring 23a. The change in the pretension or the pretensioning pressure in the line system to the at least one track tensioning hydraulic cylinder 17 will not or only minimally affect the compression position of the compression spring 23a. The track tension generated via the track tensioning apparatus is thus essentially decoupled from the spring travel of the compression spring 23a. As a result, even with greatly increased track tension, optimum damping properties of the damping device 21a are still possible, enabling particularly reliable operation. This is illustrated in FIG. 4, which shows the dependence of the track tension KS on the spring travel FW, or the current spring compression position of the compression spring 23a, compared to the prior art arrangements used so far. Curves A (spring compressor) and B (diaphragm accumulator) are assigned to the prior art and curve C to the arrangement according to the invention as shown, for example, in the embodiment example according to FIGS. 2 and 3. D indicates the optimum track tension (constant pretension). It can be seen that the arrangement described above allows an almost complete decoupling of the spring travel from the track tension.

Another essential advantage of the described arrangement is that a central damping device 21a can be provided for multiple track units. For example, several track tensioning hydraulic cylinders 17 (for example four of a total of four track units, or ideally all track units of the construction machine 1) can be simultaneously connected to said one damping device 21a and damped. This is illustrated in more detail, for example, in FIG. 8.

In the case of multiple track tensioning hydraulic cylinders at the same time, the connection of the damping device 21a to the respective track tensioning hydraulic cylinder may be made exclusively via the auxiliary tensioning connection line 27 instead of, for example, mechanical elements such as bearings. The damping device 21a can thus be arranged far away from the respective track unit. An arrangement in the dirty area of the track unit is not necessary.

Figure 5:
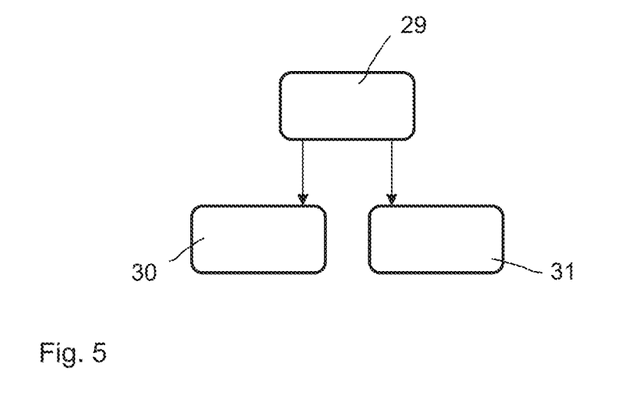
FIG. 5. is a flowchart of a method according to the invention.

FIG. 5 illustrates a method according to the invention for operating a construction machine as described above in the form of a flow chart. Step 29 comprises initially pretensioning a track of a track unit running around a drive wheel and a guide wheel with the aid of a track tensioning hydraulic cylinder with an initial pretensioning pressure, which is connected to a hydraulic pretensioning source. This can be done, for example, when starting the drive motor of the construction machine 1. The construction machine 1 does not move at this point. Step 30 now comprises damping pressure peaks occurring inside the track tensioning hydraulic cylinder with the aid of a compression spring of a damping device, for example as described above. This is done in particular during traveling operation of the construction machine. Independently of step 30, step 31 further comprises changing the initial pretensioning pressure towards a pretensioning pressure inside the track tensioning hydraulic cylinder correlating with a change in the drive pressure using an auxiliary tensioning device acting in dependence on the drive pressure in the travel drive hydraulic circuit.

Figures 6, 7:
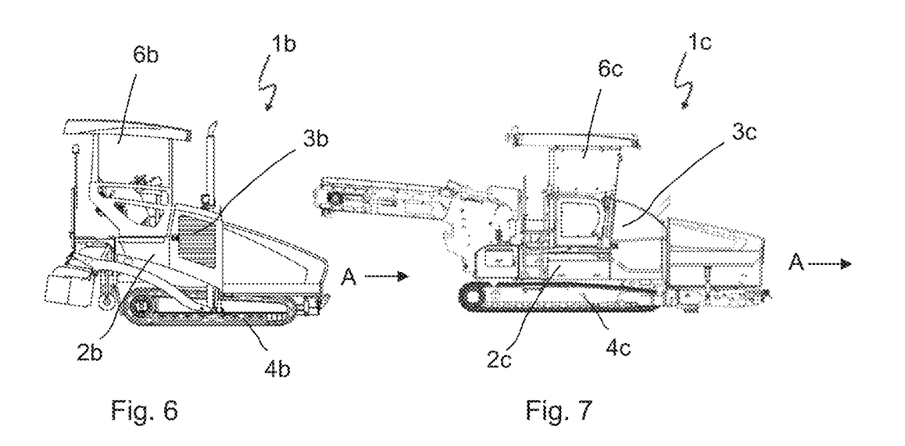
FIG. 6 is a side view of a construction machine of the road paver type.
FIG. 7 is a side view of a construction machine of the feeder type.

FIGS. 6 and 7 schematically show examples of further construction machines, in particular road construction machines, for which a damping device of the type described above is suitable, and reference is made to the above discussion for the further details of the damping device. FIG. 6 shows a road paver 1b with a machine frame 2b, a drive motor (for example a combustion engine) 3b, traveling devices in the form of track units 4b, and an operator platform 6b. FIG. 7 shows a feeder 1c with a machine frame 2c, a drive motor (for example a combustion engine) 3c, traveling devices in the form of track units 4c, and an operator platform 6c.

Figure 8:
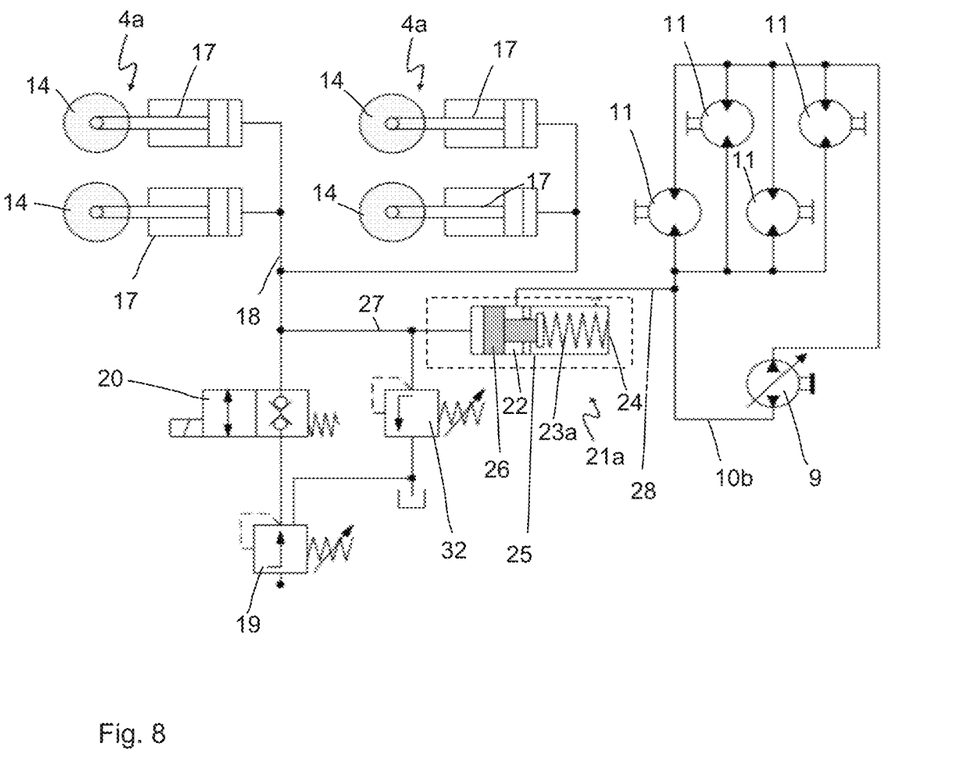
FIG. 8 shows a detail of a hydraulic circuit diagram of an alternative embodiment.

FIG. 8 shows an embodiment example which constitutes an alternative to the detail of the hydraulic circuit diagram of FIG. 3, and reference is essentially made to the above discussion, in particular of FIG. 3, with regard to the structure and the mode of operation. The main difference here is the simultaneous connection of the travel drive connection line 28 to multiple drive motors 11, or their hydraulic circuits. Specifically, each of the drive wheels 12 (not shown in FIG. 8) of the tracked vehicle 1 has its own drive motor 11. The provided drive motors 11 (in this case four) are connected in parallel and integrated into a common hydraulic circuit formed by the travel pump 9. Pressure changes are thus evenly distributed to all four of the provided track tensioning hydraulic cylinders, i.e. to all four provided track units of the tracked vehicle 1, in the entire travel drive hydraulic circuit. Furthermore, in contrast to the embodiment example of FIG. 3, there is also an adjustable pressure relief valve 32 which branches off from the auxiliary tensioning connection line 27 towards the fluid reservoir. With the aid of this valve 32, it is possible to set an adjustable upper pressure limit in the hydraulic tensioning line 18, for example to prevent excessive track tension. FIG. 8 furthermore shows a travel drive hydraulic circuit 10b.

Figure 9A:
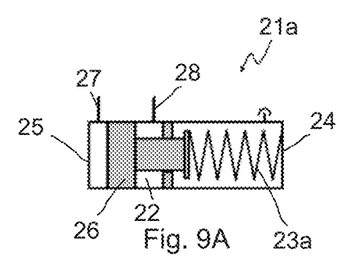
FIGS. 9A-9D show alternative embodiments of the spring tensioning cylinder.
Figure 9B:
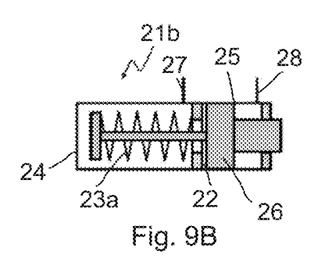
Figure 9C:
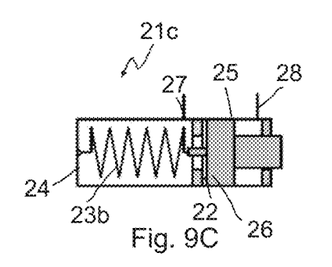
Figure 9D:
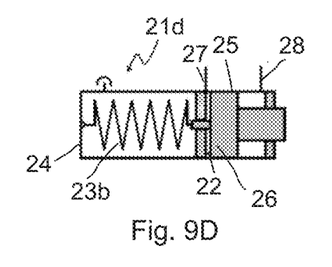

FIGS. 9A to 9D illustrate alternative configurations of the spring tensioning cylinder of the auxiliary tensioning device 25 of the damping device 21. FIG. 9A shows the auxiliary tensioning device as used in FIGS. 3 and 8. It can further be seen that the spring 23a (compression spring) arranged on the piston rod side is arranged in an interior space that is ventilated to the outside environment. In the embodiment example according to FIG. 9B, on the other hand, the spring 23a of the damping device 21b, which is again configured as a compression spring and is arranged on the piston side, is located in the hydraulic fluid towards the track tensioning hydraulic cylinder 17. The variants according to FIGS. 9C and 9D, on the other hand, relate to embodiments in which the spring 23b is configured as an extension spring. The spring 23b is in each case arranged on the piston side. In the embodiment example according to FIG. 9C, the spring 23b of the damping device 21c is again arranged in the hydraulic fluid, whereas in the embodiment example according to FIG. 9D, there is a separate interior space, sealed to the hydraulic piston 26 and ventilated to the outside environment, in which the spring 23b of the damping device 21d is positioned.

Figure 10:
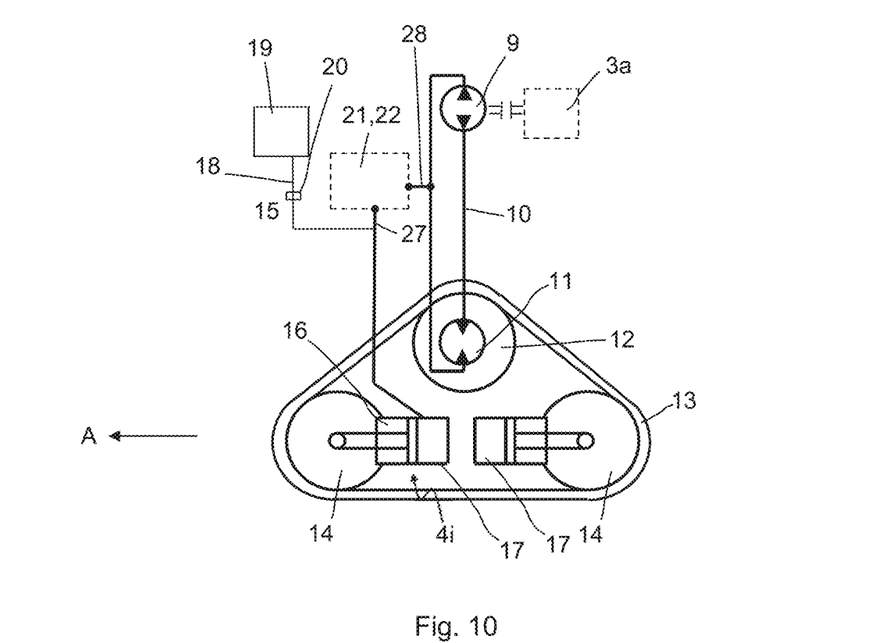
FIG. 10 is a view of a track unit of the delta unit type.

FIG. 10 shows an embodiment example of a so-called delta unit 4i according to the invention. In this regard, reference is essentially made to the above discussion of FIG. 2. The difference now is that the drive wheel 12 is arranged opposite two guide wheels 14 which are offset downwards in vertical direction, the drive wheel 12 being located in horizontal direction between the two guide wheels 14. Provision may be made for each of the two guide wheels 14, or only one of them, to have its own track tensioning hydraulic cylinder 17.

Figure 11:
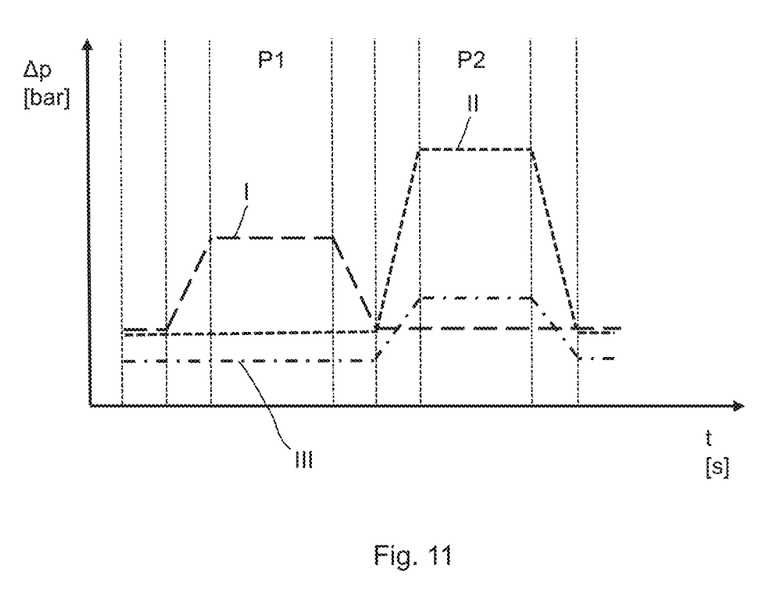
FIG. 11 shows the drive pressure curve and the correlating adjustment of the pretensioning pressure inside the track tensioning hydraulic cylinder.

The graph of FIG. 11 shows the curves of the changes of the travel drive hydraulic pressure in the travel drive hydraulic circuits 10a and 10b, or in the travel drive connection line 28 (curve II: i.e. when the high-pressure side is on this side of the hydraulic circuit between the pump and the motor during reverse travel), the pressure curve in that part of the hydraulic circuit between the pump and the motor that has no connection to the travel drive connection line 28 and is the high-pressure side during forward travel (curve I), and the resulting pressure changes in the auxiliary tensioning connection line 27, or the track tensioning hydraulic cylinders 17 (curve III). Thus the change of the initial pretensioning pressure depending on the drive pressure is shown. FIG. 11 illustrates that with the auxiliary tensioning device 22 of the damping devices 21a to 21d, a hydraulic pressure transmission occurs such that large pressure changes in the travel drive hydraulic circuit (curve II) are translated into correlating smaller pressure changes of the pretensioning pressure currently existing at the track tensioning hydraulic cylinders 17 (curve III). In the present case, the transmission ratio is approx. 3:1. FIG. 11 further shows a change of the direction of travel from forward travel (phase P1) to reverse travel (phase P2) as a function of time t. As can be seen, the travel drive connection line 28 is connected to the travel drive hydraulic circuit such that it is connected to the high-pressure side of the travel drive hydraulic circuit during reverse travel. This ensures that the tensioning pressure built up by the auxiliary tensioning hydraulic cylinder 25 at the track tensioning hydraulic cylinders 17 during reverse travel is significantly higher than during forward travel (phase I).

Figures 12A, 12B, 12C, 12D, 12E:
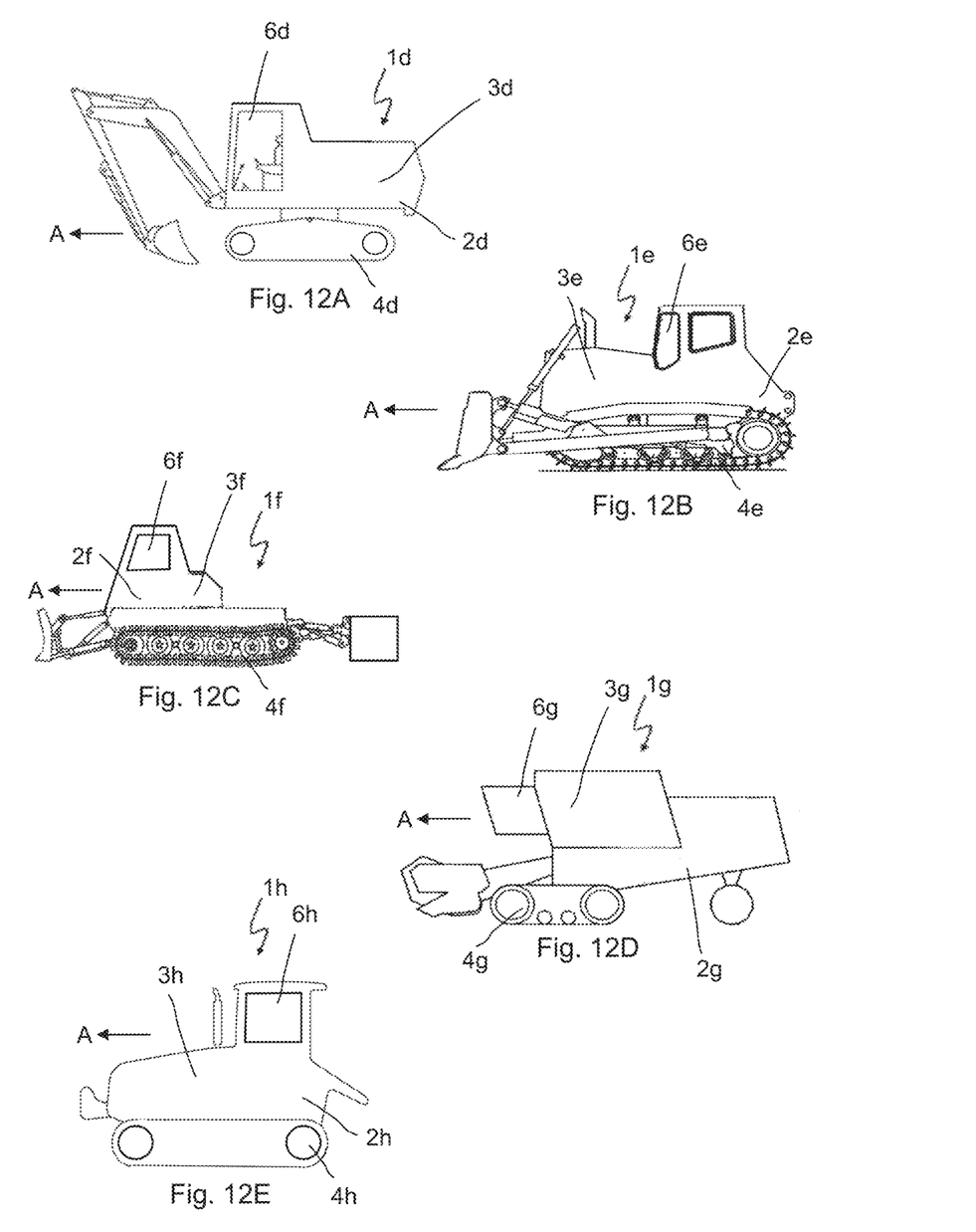
FIGS. 12A-12E show further preferred types of tracked vehicles.

FIGS. 12A to 12E finally show further tracked vehicles which are particularly suitable for the use of the damping device 21a to 21d according to the invention with auxiliary tensioning device 22 as described above. FIG. 12A shows an excavator 1d with a machine frame 2d, a drive motor (for example a combustion engine) 3d, traveling devices in the form of track units 4d, and an operator platform 6d, FIG. 12B shows a dozer or tracked loader 1e with a machine frame 2e, a drive motor (for example a combustion engine) 3e, traveling devices in the form of track units 4e, and an operator platform 6e, FIG. 12C shows a snow groomer 1f with a machine frame 2f, a drive motor (for example a combustion engine) 3f, traveling devices in the form of track units 4f, and an operator platform 6f, FIG. 12D shows an agricultural harvesting vehicle 1g with a machine frame 2g, a drive motor (for example a combustion engine) 3g, traveling devices in the form of track units 4g, and an operator platform 6g, more particularly a combine harvester, and FIG. 12E shows a hauler 1h with a machine frame 2g, a drive motor (for example a combustion engine) 3g, traveling devices in the form of track units 4g, and an operator platform 6g, in particular for use in agriculture and/or forestry. All vehicles shown in FIGS. 12A to 12E have in common that they have a drive motor, a travel pump and at least one track unit with at least one of the damping devices 21a to 21b according to the invention with an auxiliary tensioning device 22. Differences consist in particular in the respective work tool provided and the field of application.

What is claimed is:

1. A tracked vehicle comprising:
   at least one drive motor and a travel pump of a travel drive hydraulic circuit, which is driven by the drive motor, for generating a drive pressure;
   at least one track unit, the track unit comprising:
      a drive wheel driven via the travel drive hydraulic circuit, at least one guide wheel, a track endlessly running around the drive wheel and the guide wheel, as well as a track tensioning apparatus for tensioning the track, the track tensioning apparatus comprising:

an adjusting device with a track tensioning hydraulic cylinder with which the distance between two wheels of the track unit is adjustable for tensioning the track, the track tensioning hydraulic cylinder being connected via a hydraulic tensioning line to a hydraulic pretensioning source via which it can be loaded with an initial pretensioning pressure; and a damping device with a spring for damping pressure peaks in the adjusting device, wherein the damping device includes an auxiliary tensioning device which is configured such that it varies the initial pretensioning pressure independently of the pretensioning source depending on the drive pressure in the travel drive hydraulic circuit towards a pretensioning pressure inside the track tensioning hydraulic cylinder which correlates with a change in the drive pressure, and that the auxiliary tensioning device comprises an auxiliary tensioning hydraulic cylinder with a hydraulic cylinder and a cylinder piston adjustably mounted therein, which divides the interior space of the auxiliary tensioning hydraulic cylinder into a piston space and a piston rod space, wherein the auxiliary tensioning hydraulic cylinder is loaded by the spring of the damping device with an adjusting force on the piston rod side.

2. The tracked vehicle according to claim 1, wherein the auxiliary tensioning device is configured such that it increases the actual pretensioning pressure inside the track tensioning hydraulic cylinder in relation to the initial pretensioning pressure during reverse travel.

3. The tracked vehicle according to claim 1, wherein the auxiliary tensioning device is configured as a hydraulic transmission unit such that it translates pressure changes in the drive pressure into smaller pressure changes inside the track tensioning hydraulic cylinder.

4. The tracked vehicle according to claim 1, wherein in addition to the piston rod space, the auxiliary tensioning hydraulic cylinder has a compression spring space separated from the piston rod space, into which the cylinder piston projects at the end and in which the compression spring of the damping device is completely arranged.

5. The tracked vehicle according to claim 1, wherein the auxiliary tensioning device is in fluid communication with the hydraulic tensioning line or directly with the track tensioning hydraulic cylinder via an auxiliary tensioning connection line.

6. The tracked vehicle according to claim 5, wherein the auxiliary tensioning connection line and the travel drive connection line are arranged such that the auxiliary tensioning connection line is in fluid communication with a piston space and the travel drive connection line is in fluid communication with a piston rod space of the auxiliary tensioning hydraulic cylinder.

7. The tracked vehicle according to claim 1, wherein a travel drive connection line from the travel drive hydraulic circuit, in particular its high-pressure side during reverse travel, to the auxiliary tensioning hydraulic cylinder is provided via which the auxiliary tensioning hydraulic cylinder is in fluid conducting connection with the travel drive circuit.

8. The tracked vehicle according to claim 1, wherein the damping device is arranged outside the track unit.

9. The tracked vehicle according to claim 1, wherein the damping device is centrally connected simultaneously to two or more track tensioning hydraulic cylinders of two or more track units.

10. The tracked vehicle according to claim 1, wherein it is a construction machine.

11. A method for operating a tracked vehicle according to claim 1, with a track tensioning apparatus comprising the steps of:
a) Pretensioning a track of a track unit running around a drive wheel and a guide wheel with the aid of a track tensioning hydraulic cylinder with an initial pretensioning pressure, which is connected to a hydraulic pretensioning source;
b) Damping pressure peaks occurring inside the track tensioning hydraulic cylinder using a compression spring of a damping device;
c) Changing the initial pretensioning pressure towards a pretensioning pressure inside the track tensioning hydraulic cylinder correlating with a change in the drive pressure using an auxiliary tensioning device acting in dependence on the drive pressure in the travel drive hydraulic circuit.

12. The method according to claim 11, wherein step c) includes loading a cylinder piston of an auxiliary tensioning hydraulic cylinder on the input side with hydraulic fluid via a travel drive connection line which is in fluid communication with a travel drive hydraulic circuit, and that the auxiliary tensioning hydraulic cylinder is in fluid communication with the track tensioning hydraulic cylinder on the output side.

13. The method according to claim 11, wherein step c) includes performing a hydraulic transmission via the auxiliary tensioning device such that pressure peaks in the travel drive circuit are reduced towards the track tensioning hydraulic cylinder.

* * * * *